US006571740B1

(12) United States Patent
Kinder et al.

(10) Patent No.: US 6,571,740 B1
(45) Date of Patent: Jun. 3, 2003

(54) PET KENNEL

(75) Inventors: Steven F. Kinder, Dallas, TX (US);
Staci A. Mininger, Dallas, TX (US);
Timothy W. Terleski, Garland, TX
(US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

(21) Appl. No.: 10/251,973

(22) Filed: Sep. 23, 2002

(51) Int. Cl.[7] .............................. A01K 1/00; A01K 1/03
(52) U.S. Cl. ........................................ 119/497; 119/416
(58) Field of Search .................................. 119/416, 496, 119/497, 482, 484, 459; 220/4.21, 835

(56) References Cited

U.S. PATENT DOCUMENTS

| 3,490,417 | A | * | 1/1970 | Swiney .......................... 119/496 |
| 3,771,686 | A | * | 11/1973 | Brison .......................... 220/4.21 |
| D300,965 | S | | 5/1989 | Conner |
| D300,966 | S | | 5/1989 | Conner |
| D300,967 | S | | 5/1989 | Conner |
| D300,968 | S | | 5/1989 | Conner |
| 4,852,520 | A | | 8/1989 | Goetz |
| D308,429 | S | | 6/1990 | VanSkiver |
| D312,333 | S | | 11/1990 | VanSkiver |
| D314,251 | S | | 1/1991 | VanSkiver |
| 4,989,744 | A | * | 2/1991 | Tominaga .................... 220/835 |
| 5,154,137 | A | | 10/1992 | Stanaland |
| D361,175 | S | | 8/1995 | VanSkiver |
| 5,462,015 | A | | 10/1995 | Murphy |
| D364,712 | S | | 11/1995 | Murphy et al. |
| 5,471,950 | A | * | 12/1995 | White .......................... 119/497 |
| D367,732 | S | | 3/1996 | Murphy et al. |
| D367,733 | S | | 3/1996 | Paxman et al. |
| D374,510 | S | | 10/1996 | Barreto, III et al. |
| 6,182,611 | B1 | | 2/2001 | Marchioro |
| 6,427,631 | B1 | | 8/2002 | Ross |

* cited by examiner

Primary Examiner—Charles T. Jordan
Assistant Examiner—Judith A. Nelson
(74) Attorney, Agent, or Firm—Locke Liddell & Sapp LLP

(57) ABSTRACT

A pet kennel operable between a use position and a nested position. The pet kennel contains an upper portion having a top wall, a front wall, a rear wall, a first sidewall, a second sidewall and a bottom opening located opposite the top wall. The front wall, rear wall and sidewalls form a lip adjacent the bottom opening. The lower portion contains a bottom wall, a front wall, a rear wall, a first sidewall, a second sidewall and an upper opening located opposite the bottom wall. A rim is formed adjacent the upper opening by the first wall, rear wall and the sidewalls. While in the use position, the upper portion lip is mated with the lower portion rim so that the top wall is spaced apart the bottom to form the pet containment area. In the nested position, the upper portion lip mated with the lower portion rim such that the top wall is located adjacent the bottom wall. A latch, movable between a locked and an unlocked position, is connected to the upper portion so that the latch engages the lower portion rim to lock the upper and lower portions when in the use and nested position. When in the unlocked position, the latch is separated from the lower portion and includes a detent to prevent the latch from freely pivoting when unlocked.

20 Claims, 4 Drawing Sheets

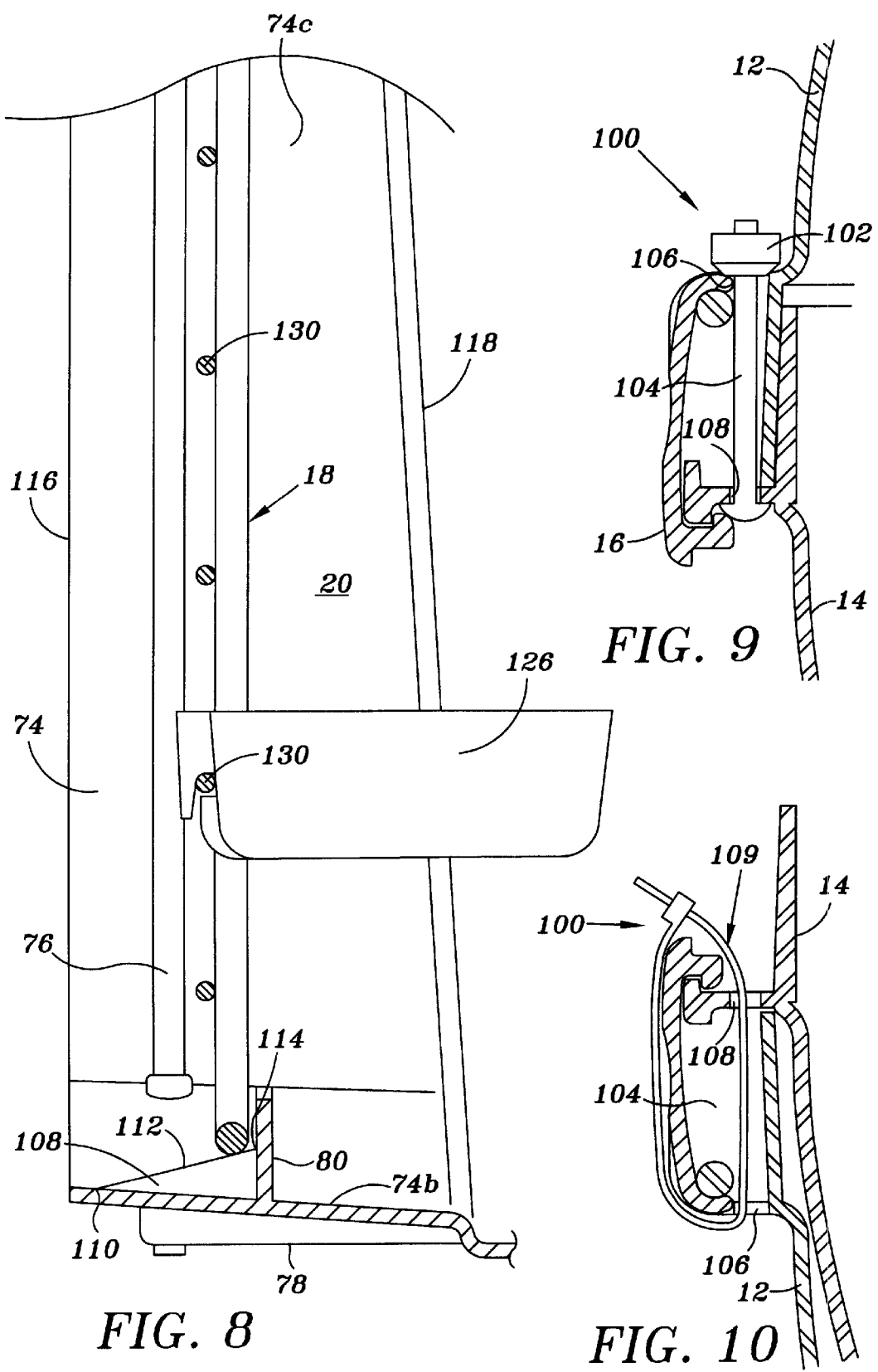

PET KENNEL

TECHNICAL FIELD OF THE INVENTION

This invention relates to a pet kennel. More particularly, this invention relates to a nestable pet kennel for compact storage including a latch mechanism to lock the kennel components together.

BACKGROUND OF THE INVENTION

A variety of nestable pet kennels having connectable upper and lower portions have been designed in order to allow for compact storage. These designs usually require the user to unhook a latch in order to separate the upper and lower portions so that the lower portion can be configured to stack or nest inside the upper portion. Oftentimes, however, when reconfiguring the kennel between the nested and assembled/use positions, the latches tend to freely rotate, often interfering with the portions fitting together. This can cause the latch to break, to detach from the kennel and/or cause damage to the kennel portions. Assembly becomes increasingly difficult because the freely rotating handles must be manually displaced when assembling the kennel portions. This can be difficult when multiple latches are used to connect the kennel portions together. Additionally, when the kennel is nested during storage and/or shipping, there is no means to lock the upper and lower portions together and the latches tend to freely rotate; thus, components may separate and the latches may snap apart.

Additionally, many prior designs tend to warp when the top and bottom portions are nested because the sidewalls are used for supporting the upper and lower portions.

Finally, when the kennel is configured in the nested position, the entranceway door must be detached and removed from the kennel. When detached, these doors are often misplaced or lost as there is no method to re-connect the door to the kennel while in the nested position.

SUMMARY OF THE INVENTION

The present invention relates to a kennel for a household pet that can be placed between a use position, where an enclosure is formed to house an animal, and a nested position, where the kennel is reconfigured to provide a compact structure for storage.

The kennel contains an upper portion and lower portion with the upper portion containing a lip so as to mate with a rim on the lower portion. While in the assembled position, the lower portion rim supports the upper portion to form an interior for holding a small animal. To place in the nested position, the lower portion rim and the upper portion lip are detached and the lower portion is re-configured such that it is housed inside the upper portion. While in this position, the lower portion rim fully supports the top lip in position to prevent the upper portion from being supported by the walls of the lower portion. This prevents the sidewalls of the upper and lower portions from warping.

At least one latch mechanism is used to lock the upper and lower portions together while in the use and nested position. The latch is rotatably connected to the upper portion such that it can be pivoted between a locked position, to hold the portions together, and an unlocked position, where the latch is fixed in position to remain open to allow separation or assembly of the upper and lower portions. The latch is prevented from moving while in the unlocked position by a detent. This reduces any chance that the latch will interfere with the attachment or detachment of the upper and lower portions.

Finally, when the upper and lower portions are in the nested position, a door storage area, located between the upper and lower portions permits the user to store the entrance door so as to prevent the door from separating when the kennel is stored.

BRIEF DESCRIPTION OF THE DRAWINGS

For a more complete understanding of the present invention and for further advantages thereof, reference is now made to the following description of the preferred embodiments taken in conjunction with accompanying drawings in which:

FIG. 8 is a section view taken along the line 8—8 of FIG. 1 illustrating the entranceway door.

FIG. 9 is a section view of the latch of FIG. 2 illustrating the locking mechanism having a nut and bolt disposed therein with the kennel configured in the use position.

FIG. 10 is a section view of the latch of FIG. 2 illustrating the locking mechanism having cable tie disposed therein with the kennel configured in the nested position.

DESCRIPTION OF THE PREFERRED EMBODIMENTS

Figures 1, 2:
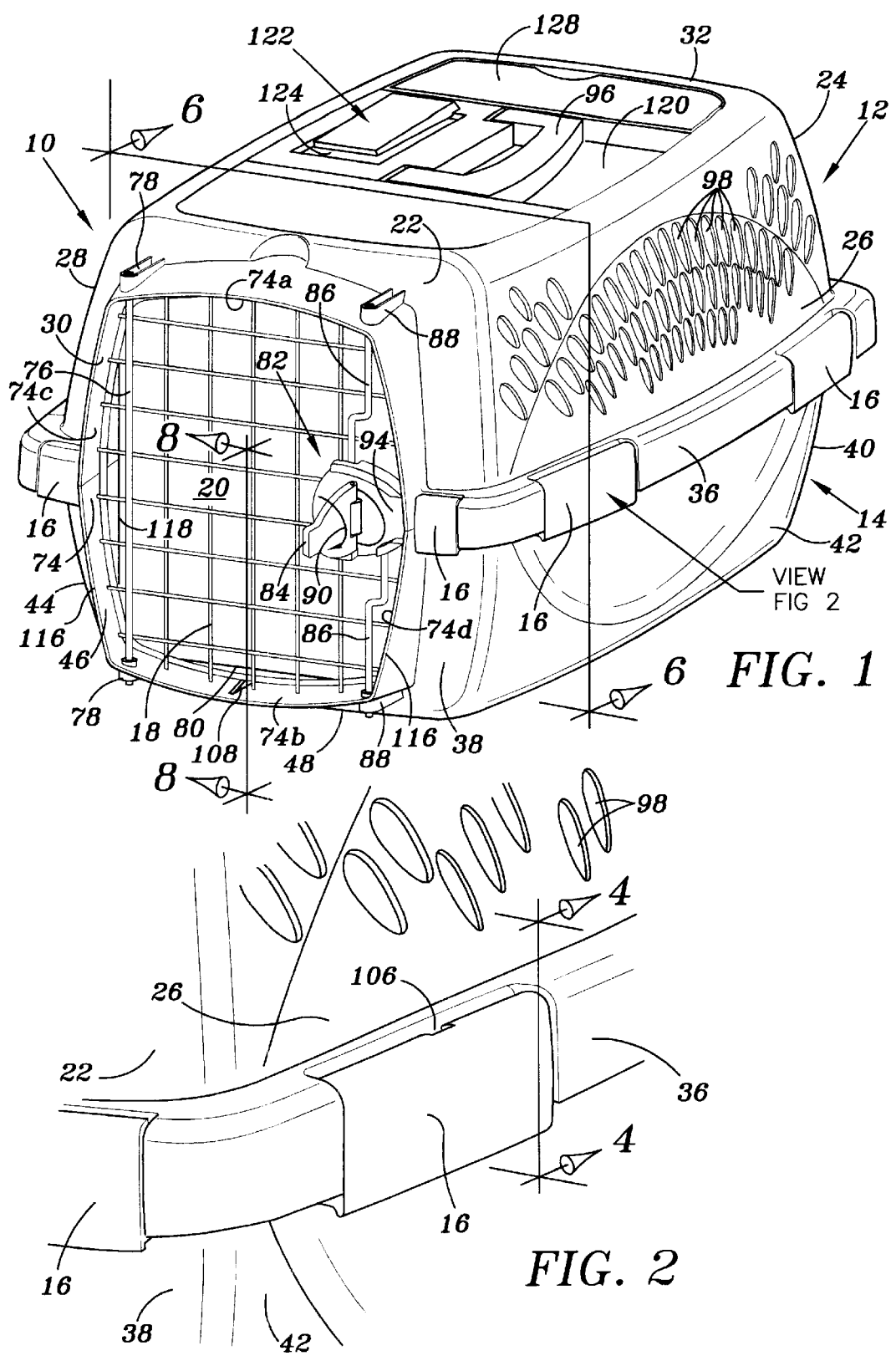
FIG. 1 is a perspective view of the pet kennel configured in the use position.
FIG. 2 is a perspective view of the latch of FIG. 1 configured in the locked position.
Figure 3:
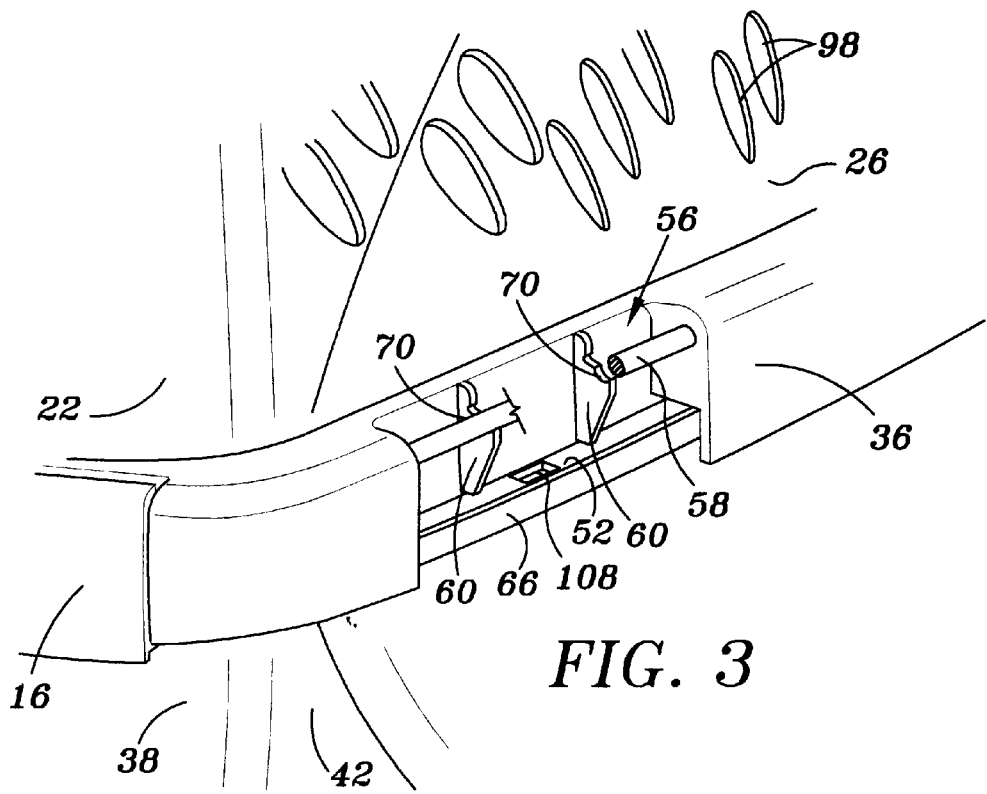
FIG. 3 is a perspective view of the receiving area of FIG. 2 with the latch removed.

FIG. 1 illustrates a pet kennel 10 comprising an upper portion 12, a lower portion 14, multiple latches 16 and an entranceway door 18 to form an interior 20 for housing a small animal. Pet kennel 10 is operable between a use position (FIG. 1), for holding a pet, and a nested position (FIG. 7), for compact storage.

As seen in FIG. 1, upper portion 12 contains a front wall 22, a rear wall 24, a first sidewall 26, a second sidewall 28, a top wall 32 and a bottom opening 34 (FIG. 6) opposite the top wall. Walls 22, 24, 26 and 28 include a lip 36 located adjacent the bottom opening 34. Front wall 22 contains an aperture 30 for the top half of entrance door 18. Lower portion 14 contains a front wall 38, a rear wall 40, a first sidewall 42, a second sidewall 44, a bottom wall 48 and an upper opening 50 (FIG. 6), located opposite the bottom wall. Walls 38, 40, 42 and 44 include a rim 52 located adjacent upper opening 50. Front wall 38 contains an aperture 46 for the bottom half of door 18. Preferably, bottom wall 48 contains a moat 54 (FIG. 6) so as to drain urine excreted by the animal.

Figure 6:
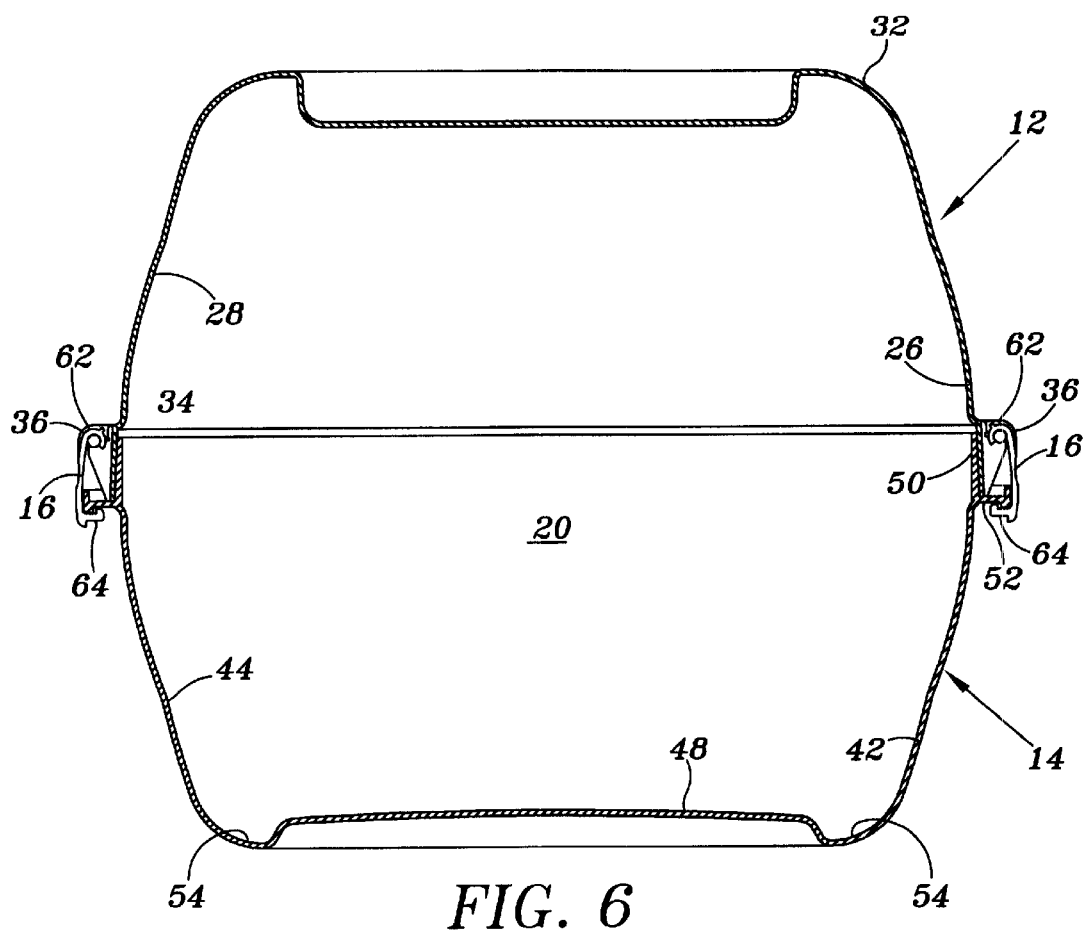
FIG. 6 is a section view taken along the line 6—6 of FIG. 1 in FIG. 1 illustrating the upper and lower portions attached in the use position.

To connect upper portion 12 to lower portion 14 in the use position, upper portion lip 36 is mated with lower portion rim 52. In this position, top wall 32 is spaced apart from bottom wall 48, as best seen in FIGS. 1 and 6, to form interior area 20 for the pet. Rim 52 is of sufficient size and strength to fully support and to distribute the weight of upper portion 12 when in the use and nested positions.

Once upper and lower portions 12 and 14 are assembled in the use position, latch 16 locks the upper and lower portions together. Referring to FIGS. 2–5, latch 16 pivotably connects to upper portion 12 inside recessed area 56. Latch 16 is hinged on a cross support member 58 (FIG. 3), which extends the entire length of recessed area 56. Multiple ribs 60 to stabilize and support cross support member 58 inside recessed area 56.

Figure 4:
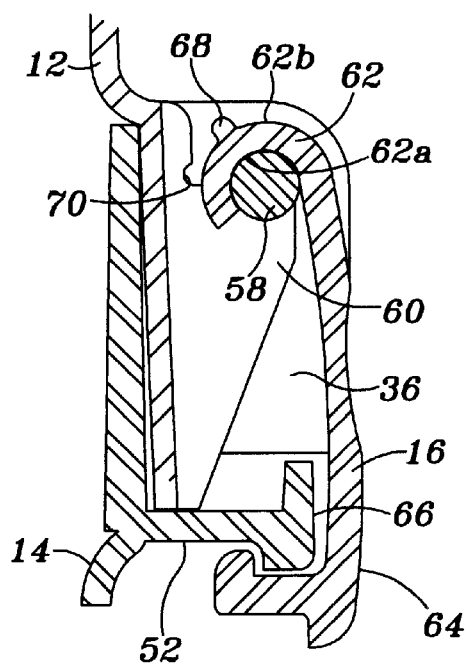
FIG. 4 is a section view of the latch of FIG. 2 with the latch configured in the locked position.

As seen in FIG. 4, latch 16 contains a curved first end 62, the curved end having an inner surface 62a and an outer surface 62b. Inner surface 62a is adaptable to pivotably engage cross support member 58. A second end 64 is adapted to engage an extension 66 on rim 52 to maintain latch 16 in the locked position. Curved first end 62 is generally semicircular in shape so that during installation, first end 62 will engage and connect to cross support member 58 using minimal force and requiring no tools. Curved first end inner surface 62a has a diameter slightly larger than the diameter of cross support member 58 to allow rotational engagement with the cross support member. While in the locked position, latch 16 mounts flush with lip 36 to maintain a low profile. This prevents the latch from interfering with pets or pet owners.

Figure 5:
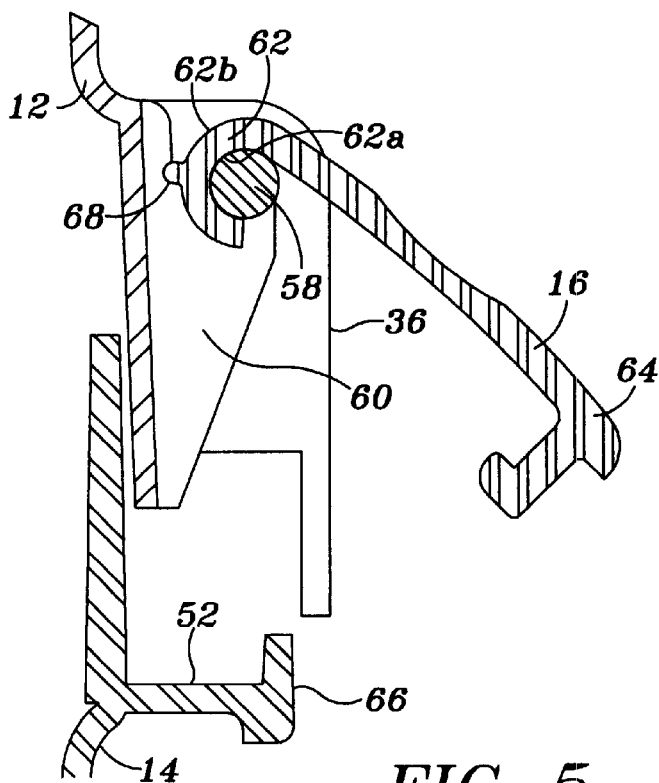
FIG. 5 is a section view of the latch of FIG. 2 illustrating the latch detached from the kennel bottom portion and configured in the unlocked position.

To unlock latch 16 from lower portion 14, the user applies a slight force to second end 64 so as to deflect the latch a sufficient amount to clear rim extension 66. Latch 16 is then laterally rotated from rim extension 68, until a detent 68, located on curved end outer surface 62b, engages a slot 70 on rib 60. When detent 68 engages slot 70, latch 16 is fixed in the unlocked position (FIG. 5). While in the unlocked position, latch 16 is prevented from freely pivoting or rotating while the latch is separated from lower portion 14. This assists the user when configuring the upper and lower portions between the use and nested positions because the latch will not loosely rotate and attach or hook onto the lower portion.

In addition to latch 16 for preventing separation of upper and lower portions 12 and 14, a locking mechanism 100 is also provided on kennel 10 (FIGS. 9 & 10). Mechanism 100 provides additional assurance that upper and lower portions 12 and 14 will not separate if any latch 16 becomes detached or damaged and can no longer securely fasten the portions 12 and 14 together. As best seen in FIGS. 2 and 9, locking mechanism 100 preferably includes a nut 102 and a bolt 104 disposed through opening 106 on latch 16 (FIG. 2) and opening 108 on rim 52 (FIG. 9). It should be realized by one of ordinary skill that nut and bolt 102 and 104 can be substituted with other fastener devices such as a cable tie 109, for example (FIG. 10). Locking mechanism 100 can be used to lock upper portion 12 and lower portion 14 together while kennel 10 is in either the use position (FIG. 9) or the nested position (FIG. 10).

As seen in FIG. 2, entrance door 18 is disposed inside door opening 74. Door opening 74 is defined by a top wall 74a, a bottom wall 74b, and sidewalls 74c and 74d, each wall having a forward edge 116 and a rear edge 118 (FIG. 8). Entrance door 18 is mounted on a door rod 76 to permit the door to pivot between an open and closed position. The ends of door rod 76 are disposed inside door rod covers 78, which are molded adjacent door opening 74. Door rod covers 78 protect the pet and pet owners from the raw edges of door rod 76. A doorstop 80 is integrally molded inside door opening 74 along bottom wall 74b so as to prevent door 18 from swinging or being pulled inside interior 20. Additionally, at least one ramp rib 108 (FIG. 8) is provided inside door opening 74. Ramp rib 108 is integrally molded along the bottom wall 74b to engage and to provide additional support to door 18 while the door is in the closed position. Rib 108 is angled upward at front portion 110 (FIG. 8) so that as door 18 is closed door 18 will travel upward along rib top surface 112 until the door 18 is placed against doorstop 80 at rib rear portion 114.

Referring to FIGS. 1 and 8, door 18 is mounted inside door opening 74 in the closed position. Door 18 is preferably centered between door opening front edge 116 and rear edge 118 of sidewalls 74c and 74d in order to further secure a small pet inside containment area 20. In prior kennels, a door is mounted adjacent the rear edge of the door opening. Oftentimes, small pets that are contained in the kennel will pull the door toward cage interior. If the pet has sufficient strength, the door will bend forming an accessway between the bent door and the door opening rear edge allowing the pet to escape. By centering the present door 18 between front and rear edges 116 and 118 and increasing the depth of walls 74c and 74d, the likelihood of a pet escaping through the accessway is substantially reduced or eliminated.

Figure 7:
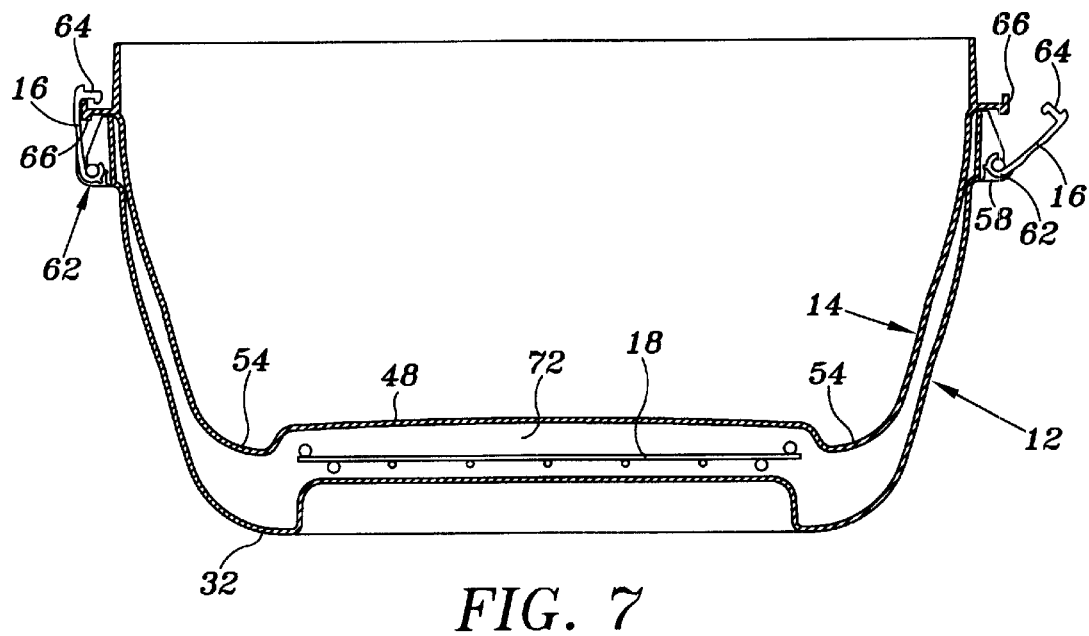
FIG. 7 is a section view of the pet kennel configured in the nested position where the lower portion is nested inside the upper portion and the door is stored in the door storage area.

When latch 16 is in the unlocked position, pet kennel 10 can be configured from the use position (FIG. 1) to the nested position (FIG. 7). During transition to the nested position, lower portion 14 is detached from upper portion 12 such that lower portion 14 can be nested inside the upper portion. This reduces the space occupied by the kennel during storage or for shipping and inventory purposes. While in this position, bottom wall 48 is placed adjacent top wall 32 and forms door a storage area 72, as best seen in FIG. 7. Door storage area 72 is of sufficient size to permit the user to store entrance door 18 to maintain the door and kennel together during storage, shipping or when maintained in inventory. In the alternative, door 18 can be stored inside lower portion 14 and attached to bottom wall 18 so that all three parts (i.e., upper portion 12, lower portion 14 and entrance door 18) can be visually inspected. While in the nested position, latch 16 is placed from the unlocked position to the locked position by snapping second end 64 over rim extension 66. When latch 16 engages rim extension 66, the latch is prevented from freely rotating and upper and lower portions 12 and 14 are locked together. Kennel 10 can be stored on either the upper portion 12 (FIG. 7) or on the lower portion 14 (not shown).

Referring to FIG. 1, a door latch 82 attached to entrance door 18 is used to lock and unlock the door. A rotatable handle 84 is used to lock and unlock entrance door 18 so as to allow the door to rotate between an open position and a closed position. In operation, handle 84 is unfolded so that the handle is disposed generally perpendicular to latch 82. After being unfolded, handle 84 is turned in the direction of arrow 90 to reciprocate rods 86 into and out of door rod covers 88. Door rods 86 remain retracted when door 18 is open so as to protect pets and pet owners from the exposed ends of latch rods 86. When it is desired to lock entrance door 18, the door is placed in the closed position and handle 84 is rotated in the opposite direction to return rods 86 inside door rod covers 88. When the ends of rods 86 are positioned inside door rod covers 88, handle 84 is folded to rest inside recessed area 94. This locks rods 86 inside door rod covers 88. Because handle 84 can be folded when not in use, the latch requires little storage space and can easily be stored while attached to door 18 inside door storage area 72.

As seen in FIG. 1, top wall 32 contains a carrying handle 96 so as to allow the user to carry the cage when either in the nested position or the use position. Handle 96 is disposed in a recessed area 120 on top wall 32 when the handle is not in use. A strap receiving member 122 is also located on top wall 32 to receive a tie down strap (preferably a seatbelt strap not shown herein) when kennel 10 is transported in a automobile. During use, the strap overlays kennel 10 and is inserted through opening 124 under member 122 to securely fasten the kennel inside the automobile. Furthermore, ventilation openings 98 allow for air to enter interior 20 for better circulation.

Referring to FIG. 8, a water tray 126 can be attached to a rod 130 of door 18 so that a pet can drink while inside cage interior 20. Water tray 126 is dimensioned such that when the tray is removed from door 18, the tray can be stored in a storage compartment 128, located on top wall 32.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

We claim:

1. A pet kennel operable between a use position and a nested position, the pet kennel comprising:

an upper portion having a top wall, a front wall, a rear wall, a first sidewall, a second sidewall and a bottom opening opposite said top wall, said front wall, rear wall and sidewalls including a lip disposed adjacent said bottom opening;

a lower portion having a bottom wall, a front wall, a rear wall, a first sidewall, a second sidewall and an upper opening opposite said bottom wall, said first wall, rear wall and said sidewalls including a rim disposed adjacent said upper opening;

said upper portion lip being mated with said lower portion rim in the pet kennel use position with said top wall being spaced apart from said bottom wall, an entranceway door opening being formed between said upper and lower portions in the kneel use position wherein said entranceway door opening is defined by a top wall, a bottom wall and a first and second sidewall, each wall further including a forward edge and a rear edge;

a door disposed between said forward and rear edges of said walls in the kennel use position;

said upper portion lip being mated with said lower portion rim in the pet kennel nested position with said top wall disposed adjacent said bottom wall;

a latch pivotably connected to said upper portion wherein said latch is movable between a locked position and an unlocked position such that when said latch is in said locked position, said latch engages said lower portion rim to lock said upper portion to said lower portion when in the use position and in the nested position; and wherein said upper portion includes a slot, and said latch further includes a detent for engaging said slot in said latch unlocked position.

2. The pet kennel of claim 1 wherein a plurality of latches are disposed on said upper portion.

3. The pet kennel of claim 1 wherein in the nested position a door storage area is between said top and bottom walls to store said door.

4. The pet kennel of claim 1 wherein said entranceway door opening bottom wall includes a doorstop.

5. The pet kennel of claim 1 wherein said entranceway door opening bottom wall contains a ramp rib disposed between said forward edge rear edges.

6. The pet kennel of claim 5 wherein said ramp rib is upwardly sloped from said forward edge to said rear edge.

7. The pet kennel of claim 1 wherein said bottom wall contains a moat.

8. The pet kennel of claim 1 wherein a carrying handle is disposed on said top wall.

9. The pet kennel of claim 8 wherein said upper portion top wall contains a recessed area for receiving said carrying handle.

10. The pet kennel of claim 1 wherein said top wall contains a storage area compartment.

11. The pet kennel of claim 1 wherein at least one of said walls includes a ventilation opening.

12. The pet kennel of claim 1 wherein one of said walls includes a slot for receiving a tie down strap.

13. The pet kennel of claim 1 wherein said door is disposed about halfway between said entranceway door forward and rear edges in the kennel use position.

14. The pet kennel of claim 10 further including a water storage bowl removably attachable to said door and received by said top wall storage area compartment.

15. The kennel of claim 1 including a locking mechanism, disposed between said upper portion lip and said lower portion rim for locking said upper and lower portions together.

16. The kennel of claim 15 wherein said locking mechanism includes a nut and bolt.

17. An attachment device for connecting a first and second member of a pet kennel, the first member having a slot, the attachment device comprising:

a latch having a first end and a second end and being movable between a locked position and an unlocked position, said first end thereof including a detent and is adapted to pivotably connect to the first member;

said detent selectively adapted to engage the slot;

wherein when said latch is in said locked position, said second end engages the second member to lock the member; and when said latch is in said unlocked position, said latch is disconnected and laterally displaced from the second member and said detent engages the slot so as to prevent said latch from moving relative to the first member.

18. The attachment device of claim 17 wherein said first end is rounded to engage a bar on the first member.

19. The attachment device of claim 17 wherein said first end contains an outer surface and an inner surface wherein said inner surface contains said detent.

20. The attachment device of claim 17 wherein said second end contains a hook to engage the second member.

* * * * *